G. HANNEN.
MODE OF CHARGING MASH FILTERS.
APPLICATION FILED MAY 12, 1914.
1,151,582.
Patented Aug. 31, 1915.
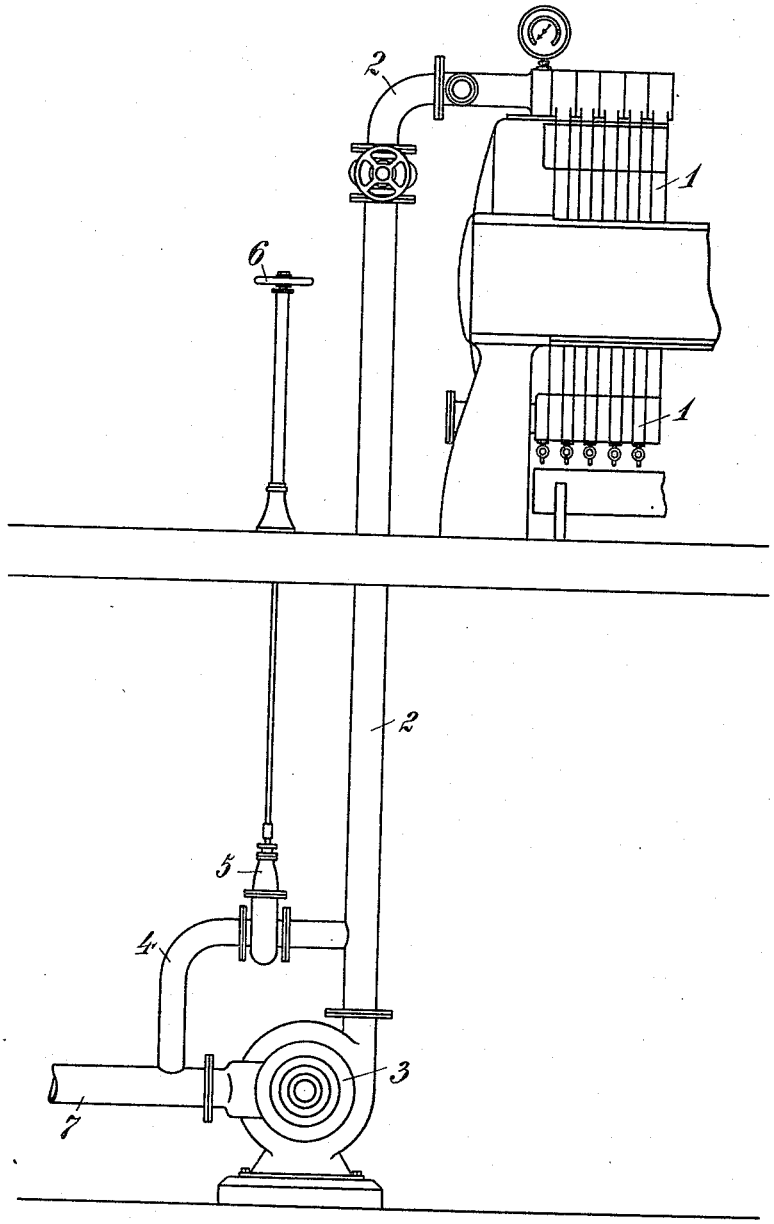
WITNESSES:
George Du Bon
Louis Alexander
INVENTOR
GUSTAV HANNEN
BY
ATTORNEYS

UNITED STATES PATENT OFFICE.

GUSTAV HANNEN, OF CORSCHENBROICH, GERMANY.

MODE OF CHARGING MASH-FILTERS.

1,151,582.  Specification of Letters Patent.  Patented Aug. 31, 1915.

Application filed May 12, 1914. Serial No. 838,107.

*To all whom it may concern:*

Be it known that I, GUSTAV HANNEN, engineer, subject of the King of Prussia, residing at Corschenbroich, Rhineland, Germany, have invented certain new and useful Improvements in Modes of Charging Mash-Filters, of which the following is a specification.

This invention relates to a method of charging mash filters with mash of lastingly uniform composition.

As is well known, a homogeneous filling is in mash filters the primary condition for a profitable lixiviating process. The mash which is a mixture of solid and liquid constituents in the form of a thick liquid pulp is antagonistic to the homogeneity of the charge for it is readily liable to become separated, that is to say, to a separation of the liquid from the solid constituents. The reasons for this must be seen in the fact that in the known methods the supply velocity and before all the pressure of the mash vary from the beginning to the end of the charging process. Numerous attempts have been made to maintain the homogeneity of the charge in mash filters, however, without the desired success. At the beginning of the charge it is easy to maintain the homogeneity because the filter surface is still unobstructed and therefore enables a quick disstructed of the liquid constituents of the extract to take place and consequently the supply velocity and the pressure to remain substantially constant. This condition, however, soon changes because the filter chambers soon become filled with the solid constituents i. e., the ground malt, so that the discharge surface for the extract becomes smaller and smaller, rendering it necessary to reduce the quantity of the ingoing mash. In the known processes this is effected either by throttling the inlet valve on the filter or the outlet valve on the mash tank, that is to say, by throttling either the pressure or the suction conduit. This throttling action, however, favors the separating tendency and detrimentally affects the homogeneity, because by each throttling the solid constituents are retained to a greater extent than the liquids and the pressure and velocity of the mash forced by the pump strongly vary. In such cases it frequently occurs that the solid constituents are caused to clog the filter to such an extent that only the liquid constituents are capable of passing therethrough. It has for this reason been proposed to reduce the number of revolutions of the pump which as a rule is a centrifugal pump; however, even by resorting to this course, no complete effect could be attained because in the first place it is extremely difficult to effect the regulation of the number of revolutions with the required precision and in the second place, because by reducing the number of revolutions the pressure and the velocity in the mash are strongly decreased, thus unfavorably affecting the process of charging. These drawbacks are to be entirely overcome by the present invention which has for its object to regulate at will the quantity of mash entering the filter without any throttling action in the mash supply conduit proper and at the same time maintaining a definite pressure in the latter and a substantially uniform speed of the mash in the feed pump. This is effected by causing a portion of the mash corresponding to the increasing charge in the mash filter to be returned prior to its entrance in the mash filter. This is realized in the simplest manner by means of the circulation pipe which *per se* is well known in connection with pumps, the effect being that the pressure in the mash is always maintained and that the quantity supplied to the filter may be regulated without any throttling in the main conduit while the velocity of flow in the supply pump remains approximately constant.

The accompanying drawing illustrates a manner of carrying the invention into effect.

In the drawing, 1 designates the mash filter to which the mash is supplied by way of a conduit 2 from a centrifugal pump 3.

4 is the circulation pipe arranged in which according to this invention is a valve or slide 5 adapted to be controlled by means of a hand-wheel 6.

7 is the conduit for sucking the mash from the mash tap.

What I claim and desire to secure by Letters Patent is:—

1. A method of charging mash filters with mash of uniform composition with the aid of a pump which consists in allowing the full volume of flow through the discharge conduit into the filters until they are partially filled and then as the filling proceeds diverting more and more of the mash to the suction conduit and thus maintaining a constant circulation of the same quantity of mash through the pump at any given pressure.

2. A method of charging mash filters with mash of uniform composition with the aid of a pump, which consists in at first permitting the full discharge of the pump through the discharge conduit into the filters and as the filling proceeds gradually diverting an increasing quantity of the mash to the suction conduit and thereby maintaining a uniform composition of the mash flowing into the filters while maintaining a constant circulation of the same quantity of mash by the pump.

In testimony whereof I have affixed my signature in presence of two witnesses.

GUSTAV HANNEN.

Witnesses:
JEAN GRUND,
CARL GRUND.

Copies of this patent may be obtained for five cents each, by addressing the "Commissioner of Patents, Washington, D. C."